United States Patent
Busch

(10) Patent No.: US 8,165,015 B1
(45) Date of Patent: Apr. 24, 2012

(54) MODIFYING A RATE BASED ON AT LEAST ONE PERFORMANCE CHARACTERISTIC

(75) Inventor: Dackary Ronald Busch, Veradale, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 237 days.

(21) Appl. No.: 11/963,714

(22) Filed: Dec. 21, 2007

(51) Int. Cl.
*H04J 1/16* (2006.01)
*H04J 3/16* (2006.01)

(52) U.S. Cl. ......... 370/228; 370/230; 370/252; 370/465
(58) Field of Classification Search .................... None
See application file for complete search history.

(56) References Cited

U.S. PATENT DOCUMENTS

| 7,613,185 | B2* | 11/2009 | Elliott | 370/392 |
| 2007/0135086 | A1* | 6/2007 | Stanford | 455/402 |
| 2008/0005156 | A1* | 1/2008 | Edwards et al. | 707/102 |
| 2008/0144502 | A1* | 6/2008 | Jackowski et al. | 370/235 |

OTHER PUBLICATIONS

U.S. Appl. No. 11/963,719, filed Dec. 21, 2007; inventor: Davison, et al.

\* cited by examiner

*Primary Examiner* — Nittaya Juntima
(74) *Attorney, Agent, or Firm* — Clements Bernard PLLC; Christopher L. Bernard; Lawrence A. Baratta, Jr.

(57) ABSTRACT

Network operating methods provide a first packet switch configured to send a plurality of packets from the first packet switch to a second packet switch via a network path traversing one or more intermediate packet switches, access data describing at least one performance characteristic of the network path, and based on the data, modify a rate at which the first packet switch sends the plurality of packets to the second packet switch via the path. Network management methods receive data describing at least one performance characteristic of a network path having a first endpoint on a first packet switch, a second endpoint on a second packet switch, the network path traversing one or more intermediate packet switches and, based on the received data, instruct the first packet switch to modify a rate at which the first packet switch sends packets to the second packet switch via the network path.

8 Claims, 6 Drawing Sheets

600

| TUNNEL | BW | LATENCY | FRAME LOSS |
|---|---|---|---|
| 528 | 20 Mbps | 1 ms | .001% |
| 530 | 50 Mbps | 3 ms | .01% |
| 532 | 30 Mbps | 5 ms | .1% |

| TUNNEL | BW | LATENCY | FRAME LOSS |
|---|---|---|---|
| 528 | 20 Mbps | 1 ms | .001% |
| 530 | 25 Mbps | 6 ms | .01% |
| 532 | 30 Mbps | 5 ms | .1% |

FIG. 7

MODIFYING A RATE BASED ON AT LEAST ONE PERFORMANCE CHARACTERISTIC

RELATED APPLICATION DATA

This application is related to simultaneously filed U.S. patent application Ser. No. 11/963,719 entitled "Deactivating a Packet Tunnel Based On At Least One Performance Characteristic" and naming Eric Stewart Davison as inventor.

TECHNICAL FIELD

The present invention, in various embodiments, relates to modifying a rate based on at least one performance characteristic.

BACKGROUND OF THE INVENTION

In some networks, a set of packet tunnels may be used to relay packets from a first packet switch to a second packet switch. The set of tunnels may provide redundancy so that if one tunnel of the set fails, packets may still be relayed from the first packet switch to the second packet switch using another tunnel of the set. Within the set of packet tunnels, one tunnel may be activated and the other tunnels of the set may be deactivated. The activated tunnel may remain active unless it is no longer able to relay packets from the first packet switch to the second packet switch.

BRIEF DESCRIPTION OF THE DRAWINGS

Preferred embodiments of the invention are described below with reference to the following accompanying drawings.

FIG. 6 is a chart illustrating performance characteristic data.
FIG. 7 is a chart illustrating other performance characteristic data.

DETAILED DESCRIPTION OF THE PREFERRED EMBODIMENTS

According to one aspect of the invention, a network operating method includes providing a first packet switch configured to send a plurality of packets from the first packet switch to a second packet switch via a network path traversing one or more intermediate packet switches.

The method also includes accessing data describing at least one performance characteristic of the network path and, based on the data, modifying a rate at which the first packet switch sends the plurality of packets to the second packet switch via the path. The method may further include notifying a network management system that is physically distinct from the first packet switch of the modified rate.

The accessing may include accessing using the first packet switch and the modifying may include modifying using the first packet switch. Alternatively, the data may be received from a device other than the first packet switch. For example, the accessing may include receiving the data from a network management system that is physically distinct from the first packet switch. Alternatively, the accessing may include receiving the data from the second packet switch or receiving the data from one of the intermediate packet switches.

A first subset of the plurality of packets may include a first Internet Protocol (IP) destination address and a second subset of the plurality of packets may include a second IP destination address. The first IP destination address may be different than the second IP destination address.

The network path may traverse a first one of the intermediate packet switches comprising a first wireless transceiver and a second one of the intermediate packet switches comprising a second wireless transceiver. The method may further include connecting the first packet switch to the first one of the intermediate packet switches using first fiber or electrically conductive cabling, connecting the first one of the intermediate packet switches to the second one of the intermediate packet switches using a wireless link, and connecting the second one of the intermediate packet switches to the second packet switch using second fiber or electrically conductive cabling.

According to another aspect of the invention, a network management method includes receiving data describing at least one performance characteristic of a network path having a first endpoint on a first packet switch, and a second endpoint on a second packet switch. The network path traverses one or more intermediate packet switches. The method also includes, based on the received data, instructing the first packet switch to modify a rate at which the first packet switch sends packets to the second packet switch via the network path.

The performance characteristic may include a frame loss value, a bit error rate value, a latency value, a jitter value, a bandwidth value, or other performance characteristic.

Figure 1:
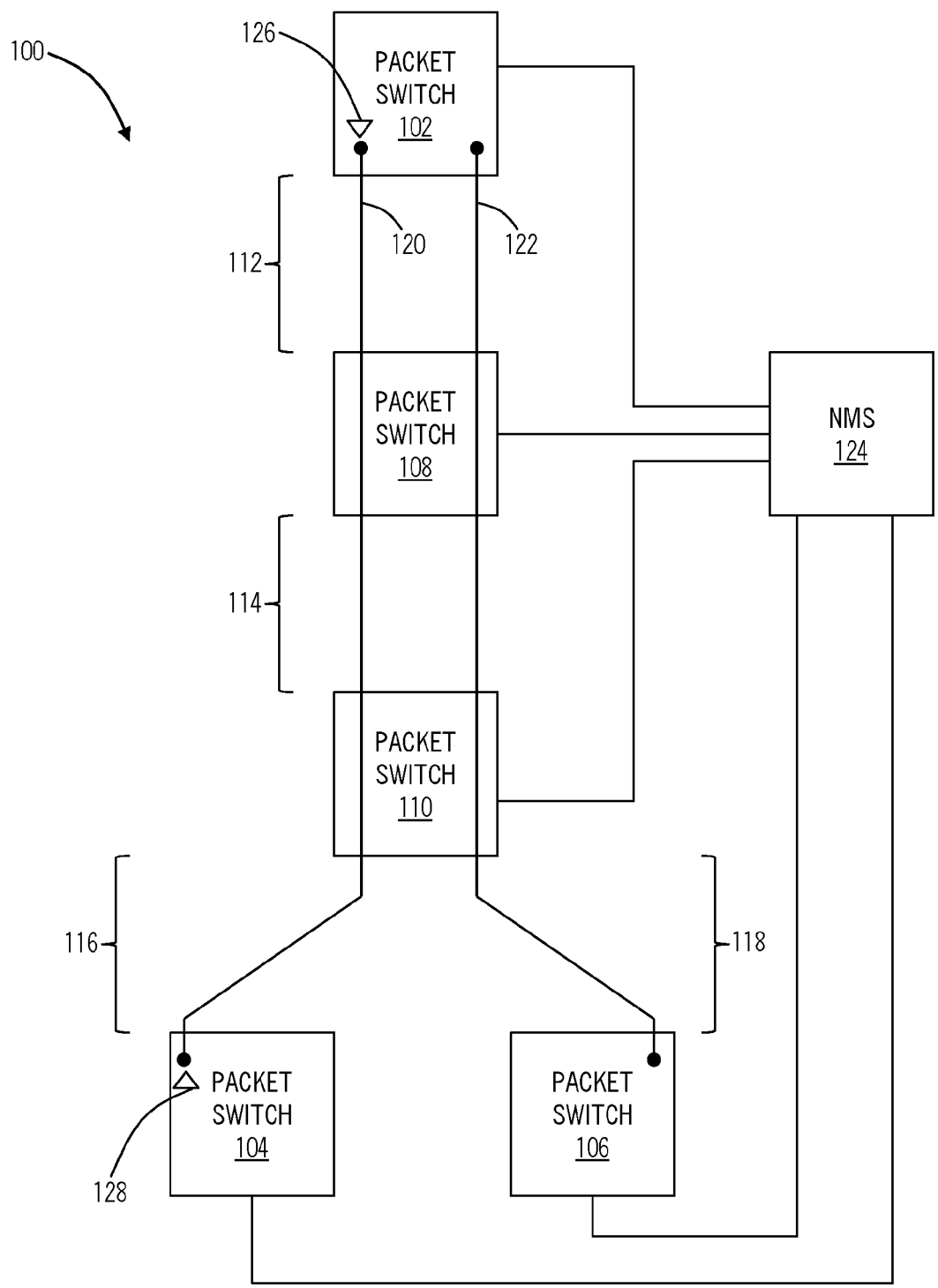
FIG. 1 is a schematic diagram of a network.

FIG. 1 illustrates a network 100 including five packet switches 102, 104, 106, 108, and 110 and a network management system (NMS) 124. A network path 120 has endpoints on packet switches 102 and 104 and traverses packet switches 108 and 110. Another network path 122 has endpoints on packet switches 102 and 106 and traverses packet switches 108 and 110.

Packet switch 102 may send a packet to packet switch 104 via network path 120. In doing so, the packet may traverse packet switches 108 and 110, which may be referred to as intermediate packet switches. Although network path 120 has an endpoint on packet switch 104, packet switch 104 might not be the final destination for the packet. Packet switch 104, after receiving the packet may forward the packet to another packet switch or device (not illustrated).

Likewise, in some configurations, the packet might not be created by packet switch 102 even though network path 120 has an endpoint on packet switch 102. Instead, packet switch 102 might receive the packet from another packet switch or device (not illustrated). Accordingly, network path 120 may represent a portion of a path traveled by the packet from the packet's origin to the packet's destination.

While being forwarded from packet switch 102 to packet switch 104, the packet may traverse a first communications link (not illustrated) that facilitates segment 112 of network path 120 and connects packet switch 102 to packet switch 108. Similarly, the packet may traverse a second communications link facilitating segment 114 of network path 120 and connecting packet switch 108 to packet switch 110 and a third communications link facilitating segment 116 of network path 120 and connecting packet switch 110 to packet switch 104.

Packet switch 102 may also send a packet to packet switch 106 via network path 122. In doing so, the packet may traverse intermediate packet switches 108 and 110. Like network path 120, network path 122 may represent a portion of a path traveled by the packet from the packet's origin to the packet's destination.

Segment 112 of network path 122 may be facilitated by the first communications link described above. In this configuration, the first communications link may facilitate both network path 122 and network path 120. Alternatively, segment 112 of network path 122 may be facilitated by a fourth communications link connecting packet switch 102 to packet switch 108. The fourth communications link might not facilitate segment 112 of network path 120. Similarly, segment 114 of network path 122 may be facilitated by the second communications link described above or may alternatively be facilitated by a fifth communications link connecting packet switch 108 to packet switch 110. Segment 118 of network path 122 may be facilitated by a sixth communications link connecting packet switch 110 to packet switch 106.

The links described above may be fiber-optic cables, electrically conductive cables, wireless links, or other links configured to relay packets between packet switches. In one configuration, network paths 120 and 122 may both be associated with a single Virtual Local Area Network (VLAN).

In sending packets to packet switch 104 via path 120, packet switch 102 need not send packets belonging to only one Transmission Control Protocol (TCP) session or packet all having a particular IP destination address. Rather, packet switch 102 may send packets associated with a plurality of different TCP sessions and packets having a plurality of different IP destination addresses.

NMS 124 may be in communication with packet switches 102, 104, 106, 108, and 110. Although NMS 124 may be in communication with packet switches 102, 104, 106, 108, and 110 as is illustrated logically in FIG. 1, NMS 124 might not be physically connected to each of packet switches 102, 104, 106, 108, and 110. In one configuration, NMS 124 may be physically distinct from the packet switches of network 100 and may be implemented as software executed by a computer.

NMS 124 may perform management functions for the packet switches of network 100. For example, NMS 124 may configure the packet switches and/or receive alarm, configuration, and/or performance information from the packet switches. In some configurations, NMS 124 may enable a user to configure the packet switches.

Packet switch 102 includes a maintenance endpoint (MEP) 126. In addition, packet switch 104 includes a MEP 128. MEPs 126 and 128 may communicate with each other via path 120 to monitor connectivity between packet switch 102 and packet switch 104. For example, MEP 126 may send continuity check messages (CCMs) compliant with the Institute of Electrical and Electronics Engineers (IEEE) 802.1ag standard. MEP 128 may receive the CCMs from MEP 126 and take action if a particular period of time expires without receiving a CCM from MEP 128. Similarly, MEP 128 may send CCMs to MEP 126 and MEP 126 may monitor the CCMs received from MEP 128 and take action if a particular period of time expires without receiving an CCM from MEP 128.

Since network path 120 traverses several links and packet switches, a rate at which packets may be forwarded from packet switch 102 to packet switch 104, may be affected by the links and packet switches facilitating path 120. For example, packet switch 102 may forward packets to packet switch 108 via segment 112 of network path 120 at a high first rate but packet switch 108 may forward packets to packet switch 110 via segment 114 of network path 120 as a low second rate. In this example, the overall rate at which packets may be forwarded from packet switch 102 to packet switch 104 may be determined by the low second rate of segment 114. Consequently, some packets sent at the high first rate from packet switch 102 to packet switch 108 may be discarded by packet switch 108.

In fact, the rates at which individual segments of network path 120 may forward packets may vary over time. For example, if segment 114 of network path 120 is facilitated by a microwave radio link, the rate at which packets may be forwarded from packet switch 108 to packet switch 110 via segment 114 may vary based on weather conditions. In another example, the rate at which packets may be forwarded from packet switch 110 to packet switch 104 via segment 116 of network path 120 may vary based on congestion in packet switch 110.

Accordingly, an overall rate at which packets may be forwarded from packet switch 102 to packet switch 104 via network path 120 may vary over time. During some periods of time, some or all of the packets sent by packet switch 102 to packet switch 104 via network path 120 may be discarded.

During these periods of time, packets may be discarded by packet switch 108 or packet switch 110. In discarding packets, packet switch 108 and/or packet switch 110 may use a method of discarding packets that discriminates against the packets associated with network path 120 in an undesirable way. For example, packet switch 108 and/or packet switch 110 may discard a large percentage or substantially all of the packets associated with network path 120 in order to favor higher priority packets. Doing so may drop a TCP session facilitated by packets relayed by network path 120 rather than allowing the TCP session to continue at a greatly reduced rate.

This undesirable discrimination may result if packet switch 108 and/or packet switch 110 is relatively unsophisticated with respect to the way it handles congestion. For example, packet switch 108 and/or packet switch 110 may have an undesirable queue depth, an undesirable number of queues, or an undesirable method of servicing queues.

Accordingly, when the rate at which network path 120 is able to relay packets changes, it may be desirable to adapt to the changed rate by controlling the number of packets sent by packet switch 102 via network path 120 rather than relying on packet switch 108 and/or packet switch 110 to adapt the number of packets relayed by network path 120 to the changed rate by discarding some of the packets transmitted by packet switch 102. Controlling the number of packets sent by packet switch 102 may be preferable if packet switch 102 has a more sophisticated congestion control capability than packet switch 108 and/or packet switch 110. For example, managing congestion at packet switch 102 may be preferable to managing congestion at packet switch 108 or packet switch 110 if packet switch 102 is configured to implement weighted random early discard (WRED) and packet switches 108 and 110 are not.

Furthermore, even if packet switch 108 and/or packet switch 110 has congestion control capability similar to packet switch 102, packet switch 108 and/or packet switch 110 might not be configured in a desired manner. For example, if a first operator operates packet switches 102 and 104 and a different second operator operates packets switches 108 and 110, the second operator may not be willing to configure packet switches 108 and 110 in a manner desired by the first operator.

Although the discussion above has focused on the effects that packet switches 108 and 110 may have on a rate at which packets are forwarded via path 120, other characteristics of the way that packets are forwarded from packet switch 102 to packet switch 104 (e.g., latency, jitter, packet loss, etc.) may additionally or alternatively be affected by packet switches 108 and 110. These characteristics may also be influenced by controlling the rate at which packet switch 102 transmits packets to packet switch 104 via path 120.

In one configuration, packet switch 102 may monitor or measure one or more performance characteristics related to network path 120 to acquire performance characteristic data. For example, packet switch 102 may determine a round-trip frame loss value, a round-trip bit error rate value, a round-trip latency value, a round-trip jitter value, a bandwidth value, or other characteristic of network path 120 by sending packets (e.g., International Telecommunications Union-Telecommunications (ITU-T) Y.1731 Ethernet operations administration and maintenance (OAM) packets or connectivity fault management protocol data unit (CFMPDU) packets such as CFMPDU loopback packets) to packet switch 104 via network path 120 and, in response, receiving packets from packet switch 104.

As an alternative to measuring or determining performance characteristic data of path 120 itself, packet switch 102 may receive the performance characteristic data from packet switch 104. For example, packet switch 104 may determine a one-way latency value, one-way jitter value, an errored frame seconds value, or a bandwidth value based on packets received from packet switch 102. In one configuration, packet switch 104 may determine the performance characteristic data based on ITU-T Y.1731 Ethernet OAM packets or CFMPDU packets.

Once packet switch 104 has determined the performance characteristic data, packet switch 104 may send the performance characteristic data to packet switch 102 (e.g., via one or more SNMP packets, one or more ITU-T Y.1731 packets, or one or more CFMPDU packets). In another configuration, packet switch 104 may analyze the performance characteristic data of path 120 and instruct packet switch 102 to modify the forwarding rate without providing the performance characteristic data to packet switch 102. For example, packet switch 104 may instruct packet switch 102 to change a committed information rate (CIR) or excess information rate (EIR) associated with path 120 or may instruct packet switch 102 to modify an ingress metering behavior and/or an egress shaping behavior of packet switch 102 as described below in relation to FIG. 4.

Similarly, packet switch 108 or packet switch 110 may determine the performance characteristic data and provide the performance characteristic data to packet switch 102. For example, packet switch 108 may provide the performance characteristic data to packet switch 102 in a type-length-value field of a link layer discovery protocol packet conforming to the IEEE 802.1AB standard. Alternatively, packet switch 108 or packet switch 110 may determine the performance characteristic data, analyze the performance characteristic data, and instruct packet switch 102 to modify the forwarding rate without providing the performance characteristic data itself to packet switch 102.

Similarly, NMS 124 may determine the performance characteristic data by accessing performance characteristic data acquired by one or more of packet switches 102, 104, 108, and 110. NMS 124 may then provide the performance characteristic data to packet switch 102, for example, via one or more Simple Network Management Protocol (SNMP) messages, one or more eXtensible Markup Language (XML) messages, a remote method invocation (RMI), or one or more NETCONF messages. Alternatively, NMS 124 may determine the performance characteristic data, analyze the performance characteristic data, and instruct packet switch 102 to modify the forwarding rate without providing the performance characteristic data itself to packet switch 102.

After acquiring performance characteristic data of path 120, packet switch 102 may determine that a forwarding rate at which packet switch 102 forwards packets to packet switch 104 via path 120 should be modified. For example, packet switch 102 may determine that the bandwidth of path 120 is less than the forwarding rate or that the round-trip latency of path 120 is excessive. Consequently, packet switch 102 may determine that it should decrease the forwarding rate so that the forwarding rate is less than or equal to the bandwidth of path 120. Alternatively, packet switch 102 may determine that it should increase the forwarding rate if the bandwidth of path 120 is greater than the forwarding rate.

Once packet switch 102 has determined that the forwarding rate associated with path 120 should be modified (e.g., by using one of the methods described above), packet switch 102 may modify the forwarding rate. By way of example, packet switch 102 may modify the forwarding rate by modifying an ingress metering behavior and/or an egress shaping behavior of packet switch 102 as described below in relation to FIG. 4.

In some configurations of network 100, packet switch 102 may notify NMS 124 that packet switch 102 has changed the forwarding rate associated with path 120. In turn, NMS 124 may convey this information to a user. The information may be useful when a service level agreement (SLA) is associated with path 120. For example, if an SLA specifies that network path 120 (or a portion thereof) is to have a particular CIR and packet switch 102 modifies the forwarding rate so that the forwarding rate is less than the CIR, the user may be benefited by knowing that the SLA may have been violated as a result of packet switch 102 modifying the forwarding rate.

In one configuration of network 100, paths 120 and 122 may both be associated with a particular VLAN identifier. In this configuration, if packet switch 102 modifies the forwarding rate associated with path 120, a forwarding rate associated with path 122 may be affected by the modification. For example, packet switch 102 might only be able to modify a forwarding rate of substantially all packets associated with the particular VLAN identifier rather than being able to modify a forwarding rate of some packets associated with the particular VLAN identifier but not modify a forwarding rate associated with other packets that are associated with the particular VLAN identifier.

According to another aspect of the invention, a first packet switch operating method includes accessing data describing at least one performance characteristic of a packet tunnel. The packet tunnel is configured to relay packets from a first tunnel endpoint on the first packet switch to a second tunnel endpoint on a second packet switch via one or more intermediate packet switches.

The accessing may include receiving a packet including the data from the second packet switch. The received packet may conform to the ITU-T Y.1731 Ethernet OAM standard. The accessing may alternatively include receiving a CFMPDU including the data from a MEP associated with the second packet switch. The CFMPDU may conform to the IEEE 802.1ag standard.

The accessed data may include data derived from the packets sent to the second tunnel endpoint via the tunnel. In some configurations, the accessing may include receiving a packet that was not relayed by the tunnel, the received packet containing the data.

The method also includes, based on the data, modifying a rate at which the first packet switch forwards packets to the tunnel. The modifying may include modifying an egress shaping behavior of the first packet switch and/or modifying an ingress metering behavior of the first packet switch. The modifying may include increasing the rate or may include decreasing the rate.

The method may further include forwarding the packets to the tunnel at the modified rate. The forwarded packets may conform to the IEEE 802.1 ah Provider Backbone Bridging standard.

The first packet switch may include a first MEP, the second packet switch may include a second MEP, and the method may include sending first IEEE 802.1ag CFMPDUs to the second MEP and receiving second IEEE 802.1ag CFMPDUs from the second MEP.

The rate may be referred to as a first rate and the method may include, using the first packet switch, transmitting packets at the decreased first rate to one of the intermediate packet switches via a link connecting the first packet switch to the one intermediate packet switch even though the link is capable of relaying packets at a second rate that is greater than the decreased first rate.

According to another aspect of the invention, a packet switch operating method includes monitoring at least one performance characteristic of a packet tunnel. The packet switch is configured to receive packets associated with the packet tunnel. The packet switch may be an intermediate packet switch of the tunnel and the method may include receiving packets associated with the tunnel and forwarding the received packets only to another packet switch associated with the tunnel. In some configurations, the packet switch may include an endpoint of the tunnel.

The method also includes determining, based on the monitoring, that data describing the monitored performance characteristic should be forwarded to a device configured to modify a rate at which packets ingress the packet tunnel and sending the data to the device. The device may be a network management system configured to evaluate the data and instruct a packet switch on which the tunnel originates to modify the rate.

The method may include, prior to the sending, receiving first packets associated with the tunnel at a rate greater than the modified rate and subsequent to the sending, receiving second packets associated with the tunnel at a rate less than or equal to the modified rate.

Figure 2:
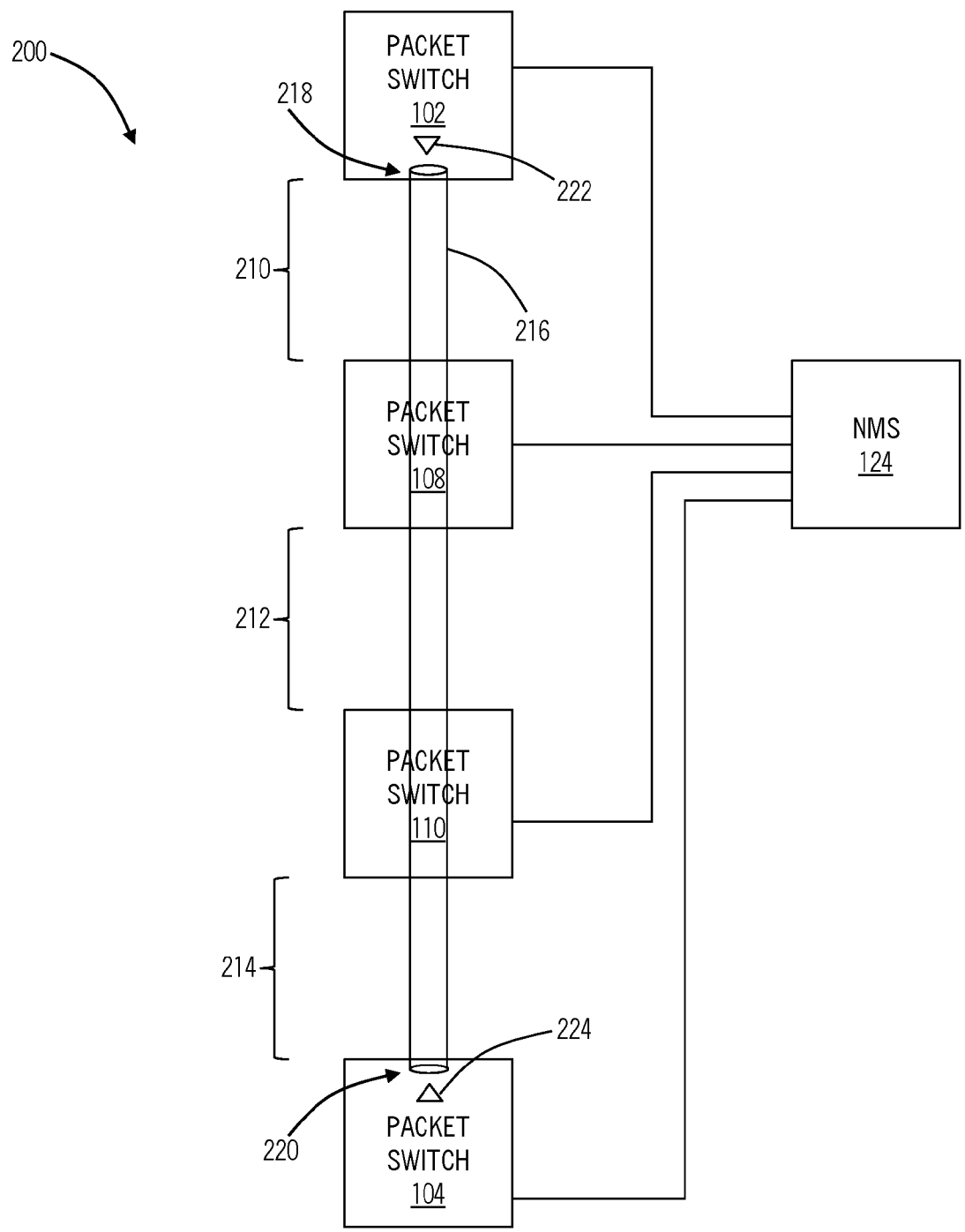
FIG. 2 is a schematic diagram of another network.

FIG. 2 illustrates a network 200. Network 200 includes packet switches 102, 104, 108, and 110 described above in relation to FIG. 1, as well as NMS 124. In network 200, packet switch 102 is connected to packet switch 104 via a packet tunnel 216. Segments 210, 212, and 214 may each be facilitated by a different link, such as a fiber-optic link, electrically conductive link, or wireless link, in a manner similar to the way the links described above facilitate paths 120 and 122 of network 100.

Packet switch 102 includes a MEP 222 and packet switch 104 includes a MEP 224. MEPs 222 and 224 may be associated with tunnel 216 and may communicate with each other using CFMPDUs in order to monitor connectivity between packet switches 102 and 104 in a manner similar to that described above in relation to MEPs 126 and 128 of FIG. 1.

Tunnel 216 includes two tunnel endpoints 218 and 220. Endpoint 218 is located on packet switch 102 and endpoint 220 is located on packet switch 104. Tunnel 216 may relay packets from packet switch 102 to packet switch 104. In fact, in one configuration, tunnel 216 may relay packets from packet switch 102 only to packet switch 104.

Packet switch 108 may receive packets associated with tunnel 216 from packet switch 102 and may forward the received packets to packet switch 110. In one configuration, packet switch 108 might not forward packets associated with tunnel 216 to a device other than packet switch 110. Similarly, packet switch 110 may receive packets associated with tunnel 216 from packet switch 108, may forward the received packets to packet switch 104, and might not forward the received packets to a device other than packet switch 104.

In some configurations, packets associated with tunnel 216 may include an identifier associated with the tunnel. For example, Ethernet packets associated with tunnel 216 may include a VLAN identifier having a particular value. Packet switches 108, 110, and 104 may use the identifier to associate packets with tunnel 216. In some configurations, packets associated with tunnel 216 may be encapsulated. For example, the packets may be Ethernet packets encapsulated according to the IEEE 802.1ah or IEEE 802.1 Qay standards so that the packets have a backbone destination address corresponding to packet switch 104.

Packet switch 102 may send packets to packet switch 104 via tunnel 216. Various performance characteristics may be associated with tunnel 216 such as those performance characteristics described above (e.g., bandwidth, latency, jitter, etc.). As with path 120 of FIG. 1, the forwarding performance of tunnel 216 may be limited by the forwarding performance of a particular segment of tunnel 216. For example, a bandwidth of segment 212 of tunnel 216 may be smaller than a bandwidth of segment 210 of tunnel 216 for various reasons described above such as congestion, weather, etc.

Consequently, it may be beneficial to modify a forwarding rate at which packet switch 102 sends packets to tunnel 216 based on the bandwidth (or based on another performance characteristic such as latency) of one of the segments of tunnel 216. One or more of the techniques described above in relation to FIG. 1 may be used to modify the forwarding rate.

For example, packet switch 102 may determine performance characteristic data of tunnel 216 based on packets sent via tunnel 216 to packet switch 104 (e.g., CFMPDUs sent to MEP 224). Alternatively or additionally, packet switch 102 may determine performance characteristic data of tunnel 216 based on packets, such as CFMPDUs sent by MEP 224, received via tunnel 216 from packet switch 104 or, if tunnel 216 is a uni-directional tunnel, packets received via a uni-directional tunnel complementary to tunnel 216. Based on the performance characteristic data, packet switch 102 may modify the forwarding rate.

Alternatively, packet switch 102 may receive performance characteristic data of tunnel 216 from packet switch 108, packet switch 110, packet switch 104, and/or NMS 124 and based on the received performance characteristic data may modify the forwarding rate. In this configuration, packet switch 102 may receive the performance characteristic data via a packet relayed by tunnel 216 (if tunnel 216 is bi-directional) or via a packet relayed outside of tunnel 216.

Alternatively, packet switches 102, 104, 108, and/or 110 may provide performance characteristic data to NMS 124. NMS 124 may analyze the performance characteristic data it receives and determine that the forwarding rate of packet switch 102 should be modified. NMS 124 may then instruct packet switch 102 (e.g., via an SNMP message) to modify the forwarding rate.

After either accessing the performance characteristic data itself or being instructed to modify the forwarding rate, packet switch 102 may modify the forwarding rate (the rate at which packet switch 102 forwards packets to tunnel 216). In one configuration, packet switch 102 may modify the forwarding rate by modifying an egress shaping behavior and/or an ingress metering behavior of packet switch 102.

By way of example illustrating the method of modifying the forwarding rate described above, packet switch 102 may receive information indicating that segment 212 of tunnel 216 has the least amount of bandwidth of the segments of tunnel 216 and that segment 212 is currently limited to 20 Mbps of bandwidth. Based on the information, packet switch 102 may determine that a bandwidth of tunnel 216 is also 20 Mbps. Consequently, packet switch 102 may reduce the rate at which it sends packets to packet switch 104 via tunnel 216 to 20 Mbps. Packet switch 102 may limit the rate in this manner even if segment 210 of tunnel 216 has an available bandwidth greater than 20 Mbps.

By reducing the forwarding rate, packet switch 102 may need to drop some packets intended for tunnel 216 that it receives from other packet switches (not illustrated) rather than forwarding the received packets and relying on packet switch 108 to reduce the forwarding rate to match the 20 Mbps bandwidth of segment 212 of tunnel 216. Dropping packets at packet switch 102 rather than packet switch 108 may be advantageous for the reasons described above in relation to FIG. 1. For example, packet switch 102 may use a desired congestion control method to drop the packets and packet switch 108 may use an undesirable congestion control method.

As a result of packet switch 102 reducing the forwarding rate to 20 Mpbs, packet switch 108 may receive packets via tunnel 216 at a rate of 20 Mbps and might not discard any of the received packets. Similarly, packet switches 110 and 104 may receive packets via tunnel 216 at a rate of 20 Mbps.

Continuing with the example, described above, packet switch 102 may subsequently receive information indicating that the bandwidth of segment 212 of tunnel 216 has increased to 40 Mbps. Consequently, packet switch 102 may increase the forwarding rate.

Figure 2A:
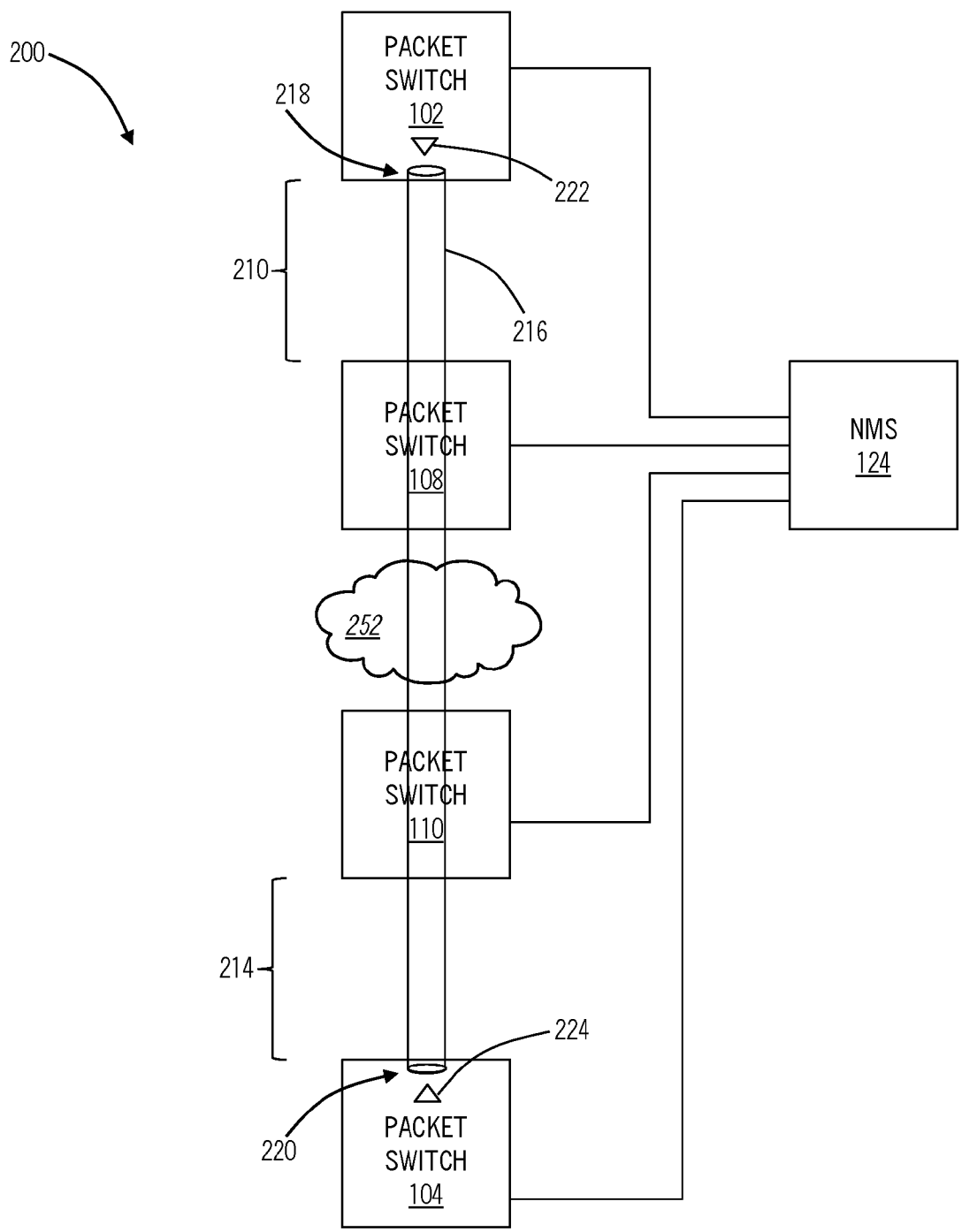
FIG. 2A is a schematic diagram of yet another network.

FIG. 2A illustrates a network 250. Network 250 includes packet switches 102, 104, 108, and 110 described above in relation to FIGS. 1 and 2, as well as NMS 124 and tunnel 216. In network 250, packet switch 108 is connected to a network 252 rather than to packet switch 110. Network 252 may facilitate tunnel 216 via one or more packet switches or other devices. Accordingly, tunnel 216 may relay packets from packet switch 102 to packet switch 104.

Packet switches 102, 104, 108, and 110 and NMS 124 may be operated by a first network operator and network 252 may be operated by a different second network operator. Consequently, network 252 might not be in communication with NMS 124. Accordingly, packet switch 102 might not receive performance characteristic data of tunnel 216 from network 252. Despite this, packet switch 102 may still determine a bandwidth or latency of a portion of tunnel 216 facilitated by network 252 based on performance characteristic data provided by packet switch 110 or packet switch 104.

If a forwarding performance of the portion of tunnel 216 facilitated by network 252 limits the overall forwarding performance of tunnel 216, packet switch 102 may modify the rate at which it forwards packets to tunnel 216 so that packets are dropped by packet switch 102 rather than a device or packet switch of network 252, which may have undesirable or unknown congestion control behavior.

According to another aspect of the invention, a packet switch includes forwarding circuitry configured to forward packets received by the packet switch to a packet tunnel extending from the packet switch to another packet switch via one or more intermediate packet switches. The packet switch also includes processing circuitry configured to access data describing at least one performance characteristic of the packet tunnel and, based on the data, modify a rate at which the forwarding circuitry forwards packets to the tunnel.

Figure 3:
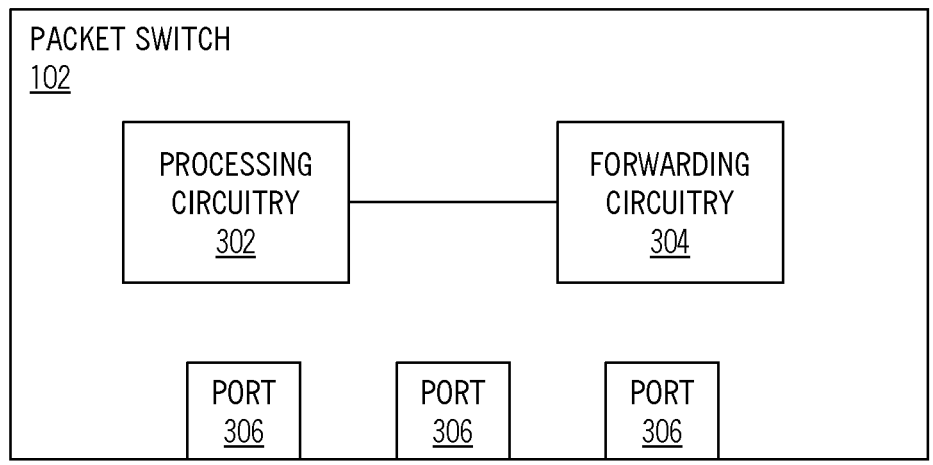
FIG. 3 is a block diagram of a packet switch.

FIG. 3 illustrates a block diagram of packet switch 102. Packet switch 102 may include processing circuitry 302, forwarding circuitry 304, and three ports 306, 308, and 310. Of course, packet switch 102 may include additional ports. Three ports are illustrated for simplicity.

Processing circuitry 302 may access performance characteristic data and determine based on the data whether to modify a forwarding rate at which forwarding circuitry 304 forwards packets to a network path such as path 120 or a tunnel such as tunnel 216. If processing circuitry 302 determines that the forwarding rate should be changed, processing circuitry 302 may modify a configuration of forwarding circuitry 304 so that forwarding circuitry 304 subsequently forwards packets to the network path or tunnel at a modified rate.

In one configuration, processing circuitry 302 may be a processor executing programming stored by memory of packet switch 102. Other implementations of processing circuitry 302 are also possible.

Forwarding circuitry 304 forwards packets between ports 306, 308, and 310. Port 310 may be associated with a network path or tunnel. Accordingly, forwarding circuitry 304 may receive packets on port 306 that are intended for the network path or tunnel and may forward the received packets to port 310.

In one configuration, forwarding circuitry 304 may be an application specific integrated circuit. Other configurations are also possible. For example, forwarding circuitry 304 may be a network processing unit.

Figure 4:
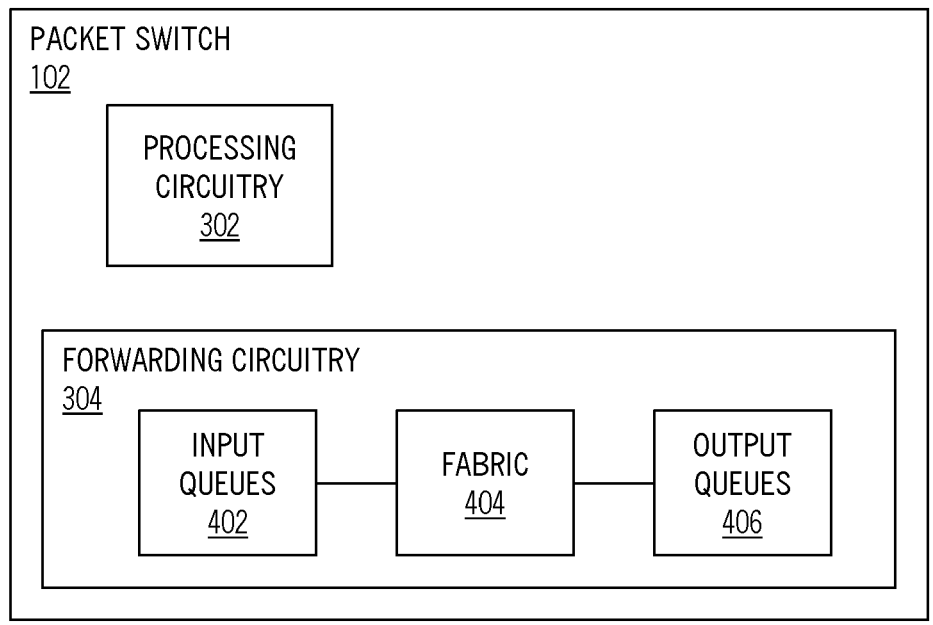
FIG. 4 is another block diagram of a packet switch.

FIG. 4 illustrates that forwarding circuitry 304 may include input queues 402, fabric 404, and output queues 406. Input queues 402 may temporarily store a packet received on one of ports 306, 308, and 310 until a destination port is determined for the packet. Once a destination port is determined, forwarding circuitry 304 may use fabric 404 to relay the packet from input queues 402 to output queues 406. Output queues 406 may temporarily store a packet received from fabric 404 until the packet can be transmitted out one of the ports.

Processing circuitry 302 may modify a rate at which forwarding circuitry 304 forwards packets to a network path or tunnel by altering a metering behavior of input queues 402 so that input queues 402 are allowed to store more or fewer of the packets intended for the network path or tunnel. Similarly, processing circuitry 302 may modify the forwarding rate by altering a shaping behavior of output queues 406. For example, if port 110 is associated with the network path or tunnel, processing circuitry 302 may alter the shaping behavior of output queues 406 so that more or fewer packets are sent to a destination packet switch, such as packet switch 104, via the network path or tunnel. Altering the metering behavior of input queues 402 or the shaping behavior of output queues 406 may be accomplished using one or more of a number of known techniques (e.g., WRED).

Performance characteristic data of a packet tunnel may also be useful when transitioning from a primary tunnel to a backup tunnel, or from a backup tunnel to a primary tunnel.

According to another aspect of the invention, a network includes a first packet switch, a second packet switch, an active primary tunnel coupling the first packet switch to the second packet switch, and an inactive backup tunnel coupling the first packet switch to the second packet switch. The first packet switch is configured to forward packets to the second packet switch via the active primary tunnel, access data describing at least one performance characteristic of the primary tunnel and, based on the data, deactivate the primary tunnel and activate the backup tunnel.

Figure 5:
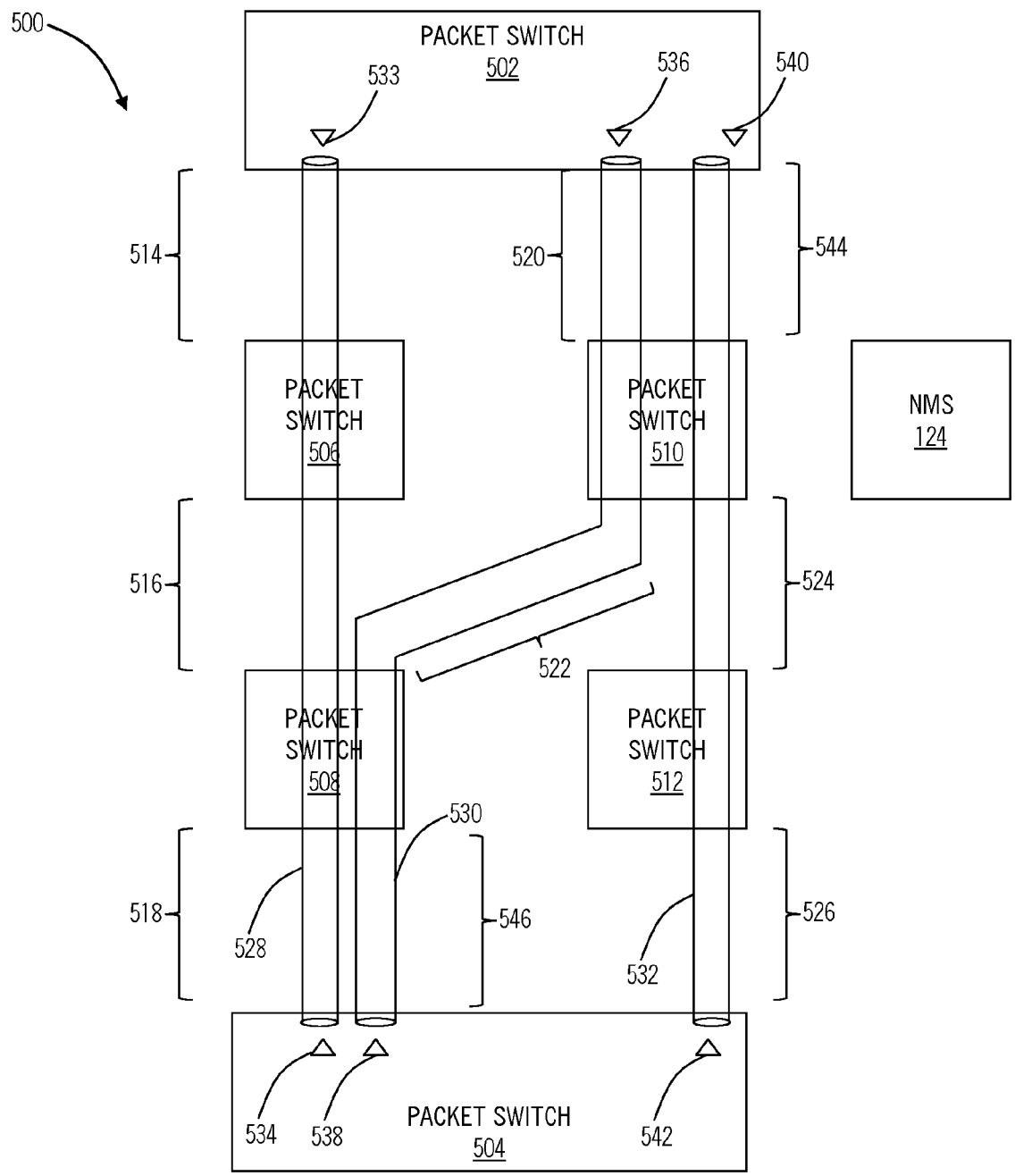
FIG. 5 is a schematic diagram of another network.

FIG. 5 illustrates a network 500. Network 500 includes six packet switches 502, 504, 506, 508, 510, and 512 and three packet tunnels 528, 530, and 532. Network 500 also includes NMS 124, which was described above.

Tunnel 528 may have a first endpoint on packet switch 502 and a second endpoint on packet switch 504 and may be relayed by intermediate packet switches 506 and 508. Similarly, tunnels 530 and 532 may also have first endpoints on packet switch 502 and second endpoints on packet switch 504 and may be relayed by intermediate packet switches 508, 510, and 512.

In one configuration, packet switch 506 might not forward packets associated with tunnel 528 to a device other than packet switch 508. Similarly, packet switch 508 may receive packets associated with tunnel 528 from packet switch 506, may forward the received packets to packet switch 504, and might not forward the received packets to a device other than packet switch 504.

In some configurations, packets associated with tunnels 528, 530, and 532 may include an identifier associated with the tunnel. For example, Ethernet packets associated with tunnel 528 may include a VLAN identifier having a particular value. Packet switches 504, 506, and 508 may use the identifier to associate packets with tunnel 528. In some configurations, packets associated with tunnel 528 may be encapsulated. For example, the packets may be Ethernet packets encapsulated according to the IEEE 802.1ah or IEEE 802.1Qay standards so that the packets have a backbone destination address corresponding to packet switch 504.

Segment 514 of tunnel 528 may be facilitated by a communication link connecting packet switch 502 to packet switch 506 and segment 516 of tunnel 528 may be facilitated by a communication link connecting packet switch 506 to packet switch 508. Segment 518 of tunnel 528 may be facilitated by a first communication link connecting packet switch 508 to packet switch 504. This first communication link between packet switch 508 and packet switch 504 may also facilitate segment 546 of tunnel 530. Alternatively, a second communication link connecting packet switch 508 to packet switch 504 may facilitate segment 546 of tunnel 530.

Segment 520 of tunnel 530 may be facilitated by a first communication link connecting packet switch 502 to packet switch 510. This first communication link between packet switch 502 and packet switch 510 may also facilitate segment 544 of tunnel 532. Alternatively, a second communication link connecting packet switch 502 to packet switch 510 may facilitate segment 544 of tunnel 532. Segment 522 of tunnel 530 may be facilitated by a communication link connecting packet switch 510 to packet switch 508.

Segment 524 of tunnel 532 may be facilitated by a communication link connecting packet switch 510 to packet switch 512. Segment 526 of tunnel 532 may be facilitated by a communication link connecting packet switch 512 to packet switch 504.

Packet switch 502 includes three MEPs 533, 536, and 540 and packet switch 504 includes three MEPs 534, 538, and 542. MEPs 533 and 534 may be associated with tunnel 528 and may communicate with each other using CFMPDUs compliant with the IEEE 802.1ag standard in order to monitor connectivity between packet switches 502 and 504 via tunnel 528 in a manner similar to that described above in relation to MEPs 126 and 128 of FIG. 1. Similarly, MEPs 536 and 538 may monitor connectivity between packet switches 502 and 504 via tunnel 530 and MEPs 540 and 542 may monitor connectivity between packet switches 502 and 504 via tunnel 532.

Tunnels 528, 530, and 532 may have one or more characteristics. Each of tunnels 528, 530, and 532 may be active or inactive. If active, the tunnel may be configured to forward control packets (e.g., bridge protocol data units (BPDUs)) and non-control packets. In some configurations, a tunnel might not forward control packets when active but instead may only forward non-control packets. If inactive, the tunnel may be configured to forward only control packets. In some configurations, packet switch 502 may prevent more than one of tunnels 528, 530, and 532 from being simultaneously active.

Each of tunnels 528, 530, and 532 may be operational or non-operational. If operational, the tunnel may capable of relaying packets from one endpoint of the tunnel to the other end of the tunnel. If non-operational, the tunnel might not be capable of relaying packets. For example, if a link facilitating segment 514 of tunnel 528 is damaged or otherwise unable to relay packets from packet switch 502 to packet switch 506, tunnel 528 may be non-operational.

Each of tunnels 528, 530, and 532 may be designated as primary or backup. If primary, the tunnel may be configured to be initially active and if backup, the tunnel may be initially inactive. Of course, a primary tunnel could later become inactive and a backup tunnel could later become active. In some configurations, one tunnel of a set of tunnels may be designated as primary and other tunnels of the set may be designated as backup.

By way of example, in FIG. 5, tunnels 528, 530, and 532 may relay packets from packet switch 502 to packet switch 504. Tunnel 528 may be designated as primary, may initially be active, and may be operational. Consequently, tunnel 528 may relay both control packets and non-control packets from packet switch 502 to packet switch 504.

Tunnels 530 and 532 may be designated as backup, may initially be inactive, and may be operational. Consequently, tunnels 530 and 532 may relay control packets (e.g., CFMPDUs used to monitor connectivity of the tunnels) from packet switch 502 to packet switch 504.

The active/inactive status of tunnels 528 and 530 may change if tunnel 528 subsequently becomes non-operational (unable to relay packets). As a result, tunnel 528 may have an inactive status. The status of tunnel 530 may change from inactive to active, and tunnel 532 may remain inactive. Thereafter, tunnel 530 may relay control packets and non-control packets and tunnel 532 may relay only control packets.

By way of another example, although tunnel 528 may initially be active and tunnel 530 may initially be inactive, the status of tunnels 528 and 530 may subsequently change if packet switch 502 accesses data describing at least one performance characteristic of tunnel 528 and determines that tunnel 530 has more favorable forwarding behavior than tunnel 528. In this example, packet switch 502 may deactivate tunnel 528 and activate tunnel 530 to take advantage of the more favorable forwarding behavior of tunnel 530 even if tunnel 528 is still operational.

Packet switch 502 may consider a variety of data in determining that tunnel 530 is more favorable than tunnel 528. For example, packet switch 502 may consider data describing more than one performance characteristic of tunnel 528 (e.g., bandwidth, jitter, latency, etc.) and may consider data describing the same performance characteristics of tunnels 530 and 532.

According to another aspect of the invention, a network operating method includes providing a first packet switch coupled to a second packet switch via a primary packet tunnel having an active status and one or more inactive backup packet tunnels having an inactive status.

A tunnel having an active status may constitute a tunnel configured to forward control packets and non-control packets from the first packet switch to the second packet switch. A tunnel having an inactive status may constitute a tunnel configured to forward only control packets from the first packet switch to the second packet switch.

The method also includes accessing data describing at least one performance characteristic of the primary packet tunnel, and, based at least on the data, deactivating the primary packet tunnel while still operational and activating one of the backup packet tunnels. The method may further include notifying a network management system that is physically distinct from the first packet switch of the deactivating and the activating.

The method may further include, subsequent to the accessing the first and second data and based at least in part on the first and second data, determining that the one backup packet tunnel is able to forward packets at a higher rate than the primary packet tunnel.

The data may be referred to as first data and the method may further include accessing second data describing performance characteristics of the one or more backup packet tunnels. The deactivating may include deactivating based on the first data and the second data.

The performance characteristic may be a one-way frame loss value, a one-way bit error rate value, a one-way latency value, a one-way jitter value, a round-trip frame loss value, a round-trip bit error rate value, a round-trip latency value, a round-trip jitter value, an errored frame seconds value, a bandwidth value, or other performance characteristic.

The accessing may include accessing using the first packet switch and the deactivating may include deactivating using the first packet switch. Alternatively, the accessing may include accessing using a network management system and the method may further include, using the network management system, instructing the first packet switch to perform the deactivating and the activating. The accessing may include receiving the data from either the second packet switch or a network management system.

According to another aspect of the invention, a network operating method includes providing a first device coupled to a second device via an active primary packet tunnel and one or more inactive backup packet tunnels. The primary packet tunnel may traverse one or more intermediate packet switches, and the primary packet tunnel may include a first endpoint associated with the first device and a second endpoint associated with the second device.

The method also includes accessing data describing performance characteristics of the one or more backup packet tunnels and, based at least on the data, deactivating the primary packet tunnel and activating one of the backup packet tunnels. The method may further include preventing more than one tunnel selected from among the primary packet tunnel and the one or more backup packet tunnels from being simultaneously active.

The method may further include, subsequent to the accessing and immediately prior to the deactivating, sending a packet from the first device to the second device via the primary packet tunnel and receiving the packet from the primary packet tunnel at the second device.

According to another aspect of the invention, a first packet switch operating method includes accessing data describing at least one performance characteristic of an active first packet tunnel. The active first packet tunnel is configured to relay packets from a first tunnel endpoint on the first packet switch to a second tunnel endpoint on a second packet switch via one or more intermediate packet switches. The accessed data may include data derived from packets sent to the second tunnel endpoint via the active first packet tunnel. In some configurations, the accessing may include receiving a packet that was not relayed by the first packet tunnel. The received packet may contain the data.

The method also includes, based at least on the data, deactivating the first packet tunnel and activating a second packet tunnel. The activated second packet tunnel is configured to relay packets from the first packet switch to the second packet switch.

The method may further include, subsequent to the accessing, waiting a user-configurable amount of time before the deactivating of the first packet tunnel. The method may further include, prior to the deactivating, preventing packets other than control packets and packets conforming to the IEEE 802.1Qay provider backbone bridging traffic engineering (PBB-TE) standard from being forwarded to the active first packet tunnel.

The first packet switch may include a first MEP, the second packet switch may include a second MEP, and the data may be derived from IEEE 802.1ag CFMPDUs sent from the first MEP to the second MEP and/or from IEEE 802.1ag CFMPDUs sent from the second MEP to the first MEP.

According to another aspect of the invention, a packet switch operating method includes monitoring at least one performance characteristic of an active first packet tunnel configured to forward packets from a first device to a second device. The packet switch is configured to receive packets associated with the first packet tunnel.

The method also includes determining, based on the monitoring, that data describing the monitored performance characteristic should be forwarded to the first device. The first device is configured to selectively deactivate the first packet tunnel and activate a second packet tunnel configured to forward packets from the first device to the second device. The method also includes sending the data to the first device.

The packet switch may be an intermediate packet switch of the first packet tunnel and the method may further include receiving packets associated with the first packet tunnel and forwarding the received packets only to another packet switch associated with the first packet tunnel. Alternatively, the packet switch may be an endpoint of the first packet tunnel.

Returning now to FIG. 5, packet switch 502 may determine performance characteristic data of tunnel 528 based on packets sent via tunnel 528 to packet switch 504 (e.g., CFMPDUs sent to MEP 534). Alternatively or additionally, packet switch 502 may determine performance characteristic data of tunnel 528 based on packets, such as CFMPDUs sent by MEP 534, received via tunnel 528 from packet switch 504 or, if tunnel 528 is a uni-directional tunnel, packets received via a uni-directional tunnel complementary to tunnel 528. Packet switch 502 may similarly determine performance characteristic data of tunnels 530 and 532.

The performance characteristic data may describe one or more performance characteristics of a tunnel. The performance characteristics may be the performance characteristics described above (e.g., bandwidth, latency, jitter, frame loss, errored seconds, etc.).

Based on the performance characteristic data of tunnels 528, 530, and/or 532, packet switch 502 may modify the status of tunnels 528, 530, and/or 532. For example, tunnel 528 may be active and packet switch 502 may determine, based on performance characteristic data, that tunnel 530 is able to forward packets from packet switch 502 to packet switch 504 at a higher rate than tunnel 528. Packet switch 502 may subsequently deactivate tunnel 528 (even though tunnel 528 may still be operational), activate tunnel 530, and leave tunnel 532 as inactive. Since tunnel 528 may be operational prior to being deactivated and subsequent to being deactivated, packet switch 502 may forward packets to packet switch 504 via tunnel 528 up until a point in time immediately prior to deactivating tunnel 528.

In some configurations, after determining that a currently inactive tunnel (e.g., tunnel 530) has more desirable forwarding characteristics than a tunnel that is currently active (e.g., tunnel 528), packet switch 502 may wait a period of time prior to activating the currently inactive tunnel and deactivating the currently active tunnel to see if the forwarding characteristics of the currently active tunnel improve. In some configurations, the duration of the period of time may be user configurable.

If the forwarding characteristics of the currently active tunnel improve, packet switch 502 need not deactivate the currently active tunnel and activate the currently inactive tunnel. Waiting the period of time may also ensure that the more desirable forwarding characteristics of the currently inactive tunnel are sustained rather than being transitory.

Alternatively, packet switch 502 may receive performance characteristic data of tunnels 528, 530, and/or 532 from packet switch 506, packet switch 508, packet switch 510, packet switch 512, packet switch 504 and/or NMS 124 and based on the received performance characteristic data may modify the active/inactive status of two of tunnels 528, 530, and 532. In this configuration, packet switch 502 may receive the performance characteristic data via one or more packets relayed by tunnels 528, 530, and/or 532 or via a packet relayed outside of tunnel 528, 530, and 532.

Alternatively, packet switches 506, 508, 510, 512, and/or 504 may provide performance characteristic data to NMS 124. NMS 124 may analyze the performance characteristic data it receives and determine that the active/inactive status of two of tunnels 528, 530, and 532 should be modified. NMS 124 may then instruct packet switch 502 (e.g., via an SNMP message) to modify the active/inactive status of two of tunnels 528, 530, and 532.

Packet switch 502 may notify NMS 124 when packet switch 502 has changed the active/inactive status of any of tunnels 528, 530, or 532 so that NMS 124 may keep track of the status of tunnels 528, 530, or 532 and inform a user of NMS 124 of the status of tunnels 528, 530, or 532.

FIG. 6 illustrates a chart 600 depicting performance characteristic data for tunnels 528, 530, and 532 as of a first moment in time. As of the first moment in time, tunnel 530 may be designated as primary and may have an active status. Accordingly, tunnel 530 may be relaying non-control packets from packet switch 502 to packet switch 504.

When compared to tunnel 528, tunnel 530 has a higher bandwidth but also has a larger latency and larger frame loss than tunnel 528. In some configurations, the fact that tunnel 528 has a better latency and frame loss than tunnel 530 may be enough to prompt packet switch 502 to deactivate tunnel 530 and activate tunnel 528 even though tunnel 528 has a lower bandwidth. For example, if tunnel 530 is relaying voice over IP packets that are very sensitive to latency and that require less than 20 Mbps of bandwidth, tunnel 528 may be a better choice than tunnel 530.

In other configurations, bandwidth may be the dominant factor in selecting a tunnel. Packet switch 502 may be configured to select a tunnel from among tunnels 528, 530, and 532 that has the highest bandwidth and that has latency and frame loss values that are below a threshold. For example, the threshold for latency may be 8 ms and the threshold for frame loss may be 0.5%. In this example, packet switch 502 may determine that tunnels 528, 530, and 532 all have acceptable latency and frame loss values below the thresholds. Consequently, packet switch 502 may select the tunnel having the greatest bandwidth from among tunnels 528, 530, and 532, namely, tunnel 530.

Thus, packet switch 502 may select a tunnel based on more than one performance characteristic. As was described above, packet switch 502 may access the performance characteristic data of chart 600 in many different ways. For example, packet switch 502 may determine the data itself, may receive the data from one or more of packet switches 504, 506, 508, 510, and 512, or may receive the data from NMS 124.

FIG. 7 illustrates a chart 700 depicting performance characteristic data for tunnels 528, 530, and 532 as of a second moment in time subsequent to the first moment in time. After accessing the data of chart 700, packet switch 502 may determine that tunnel 530 should no longer be active because either tunnel 528 or tunnel 532 offers better forwarding performance.

In a first example, packet switch 502 may deactivate tunnel 530 and activate tunnel 532 since tunnel 532 offers greater bandwidth than tunnel 530. In a second example, packet switch 502 may deactivate tunnel 530 and activate tunnel 528. In this example, packet switch 502 may have a latency threshold of 4 ms and may determine that tunnel 530 is no longer acceptable due to its latency value of 6 ms and that tunnel 528 is more attractive than tunnel 532 because tunnel 528 has a latency value below the threshold. Packet switch 502 may make this determination even though tunnel 532 offers greater bandwidth than tunnel 528.

Accordingly, packet switch 502 may be configured to consider performance characteristic data in a variety of different ways in order to match a tunnel's forwarding performance with a type of data to be forwarded.

Activating and deactivating tunnels based on performance characteristic data may be beneficial when compared with known methods of activating and deactivating tunnels based solely on a tunnel's operational status. When activating and deactivating based only on operational status, packet switch 502 might not deactivate tunnel 528 as long as MEPs 533 and 534 indicate that tunnel 528 is operational (e.g., based on CFMPDUs exchanged by MEPs 533 and 534). However, even though tunnel 528 may be operational, tunnel 530 or tunnel 532 may offer better forwarding performance. Accordingly, using performance characteristic data to determine which of a set of associated tunnels to activate may result in better network performance than relying solely on operational status of the associated tunnels.

According to another aspect of the invention, an article of manufacture includes media including programming configured to cause processing circuitry (e.g., a microprocessor) to perform processing that executes one or more of the methods described above. The programming may be embodied in a computer program product(s) or article(s) of manufacture, which can contain, store, or maintain programming, data, and/or digital information for use by or in connection with an instruction execution system including processing circuitry. In some cases, the programming may be referred to as software, hardware, or firmware.

For example, the media may be electronic, magnetic, optical, electromagnetic, infrared, or semiconductor media. Some more specific examples of articles of manufacture including media with programming include, but are not limited to, a portable magnetic computer diskette (such as a floppy diskette or a ZIP® disk manufactured by the Iomega Corporation of San Diego, Calif.), hard drive, random access memory, read only memory, flash memory, cache memory, and/or other configurations capable of storing programming, data, or other digital information.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A network operating method comprising:
providing a first packet switch configured to send a plurality of packets from the first packet switch to a second packet switch;
transmitting the plurality of packets from the first packet switch to the second packet switch via one of the plurality of packet tunnels traversing one or more intermediate packet switches, each of the one or more intermediate packet switches configured to retain packets instead of dropping;
accessing or calculating data describing at least one performance characteristic of the plurality of packet tunnels at the first packet switch, wherein the at least one performance characteristic is determined based on any of the first packet switch, the second packet switch, the one or more intermediate packet switches, and a plurality of different physical links therebetween; and
using the same control circuitry, based on data describing at least one performance characteristic of one of the plurality of packet tunnels, modifying a rate at which the first packet switch sends the plurality of packets to the second packet switch via one of the plurality of packet tunnels or, based on data describing at least one performance characteristic of all of the plurality of packet tunnels, modifying which packet tunnel of the plurality tunnels is used between the first packet switch and the second packet switch, wherein congestion control is provided based on either modifying at the first packet switch, the congestion control comprising dropping packets at the first packet switch instead of dropping packets at the one or more intermediate packet switches and based on physical and environmental conditions on the plurality of different physical links.

2. The method of claim 1 wherein one of the plurality of packet tunnels traverses a first one of the intermediate packet switches comprising a first wireless transceiver and a second one of the intermediate packet switches comprising a second wireless transceiver and further comprising connecting the first packet switch to the first one of the intermediate packet switches using first fiber or electrically conductive cabling, connecting the first one of the intermediate packet switches to the second one of the intermediate packet switches using a wireless link, and connecting the second one of the intermediate packet switches to the second packet switch using second fiber or electrically conductive cabling.

3. A first packet switch operating method comprising:
accessing or calculating data describing at least one performance characteristic of a plurality of packet tunnels, the plurality of packet tunnels being configured to relay packets from a first tunnel endpoint on the first packet switch to a second tunnel endpoint on a second packet switch via one or more intermediate packet switches with one of the plurality of packet tunnels actively relaying packets at a time, wherein the at least one performance characteristic is determined at the first packet switch based on any of the first packet switch, the second packet switch, the one or more intermediate packet switches, and a plurality of different physical links therebetween; and
using the same control circuitry, based on data describing at least one performance characteristic of one of the plurality of packet tunnels, modifying a rate at which the first packet switch forwards packets to the one of the plurality of packet tunnels or, based on data describing at least one performance characteristic of all of the plurality of packet tunnels, modifying which packet tunnel of the plurality tunnels is used to actively relay packets between the first packet switch and the second packet switch, wherein congestion control is provided based on either modifying at the first packet switch, the congestion control comprising dropping packets at the first packet switch instead of dropping packets at the one or more intermediate packet switches and based on physical and environmental conditions on the plurality of different physical links.

4. A packet switch comprising:
forwarding circuitry configured to forward packets received by the packet switch to one or more packet tunnels extending from the packet switch to another packet switch via one or more intermediate packet switches configured to retain the packets instead of dropping; and
control circuitry configured to:
access or calculate data describing at least one performance characteristic of the one or more packet tunnels, wherein the at least one performance characteristic is determined based on any of the packet switch, the another packet switch, the one or more intermediate packet switches, and a plurality of different physical links therebetween; and
in the case of a plurality of packet tunnels, based on the data, modify a rate at which the forwarding circuitry forwards packets to an active packet tunnel of the plurality of packet tunnels using data related to the active packet tunnel or change the active packet tunnel to another packet tunnel of the plurality of packet tunnels using data related to all of the packet tunnels, wherein congestion control is provided based on the modifying at the packet switch, the congestion control comprising dropping packets at the packet switch instead of dropping packets at the one or more intermediate packet switches and based on physical and environmental conditions on the plurality of different physical links.

5. A network operating method comprising:
operating a packet tunnel between a first packet switch and a second packet switch to send a plurality of packets therebetween, wherein the packet tunnel comprises at least one intermediate packet switch between the first packet switch and the second packet switch, the at least one intermediate packet switch is configured to not drop any of the plurality of packets;
accessing or calculating data describing at least one performance characteristic of the packet tunnel and other packet tunnels at one of the first packet switch, the at least one intermediate packet switch, and the second packet switch, wherein the at least one performance characteristic is determined based on the packet tunnel and other packet tunnels between the first packet switch and the second packet switch;
for the data accessed or calculated at the at least one intermediate packet switch and the second packet switch, transmitting the data to the first packet switch in a type-length-value field of a link layer discovery protocol; and based on the data, modifying a rate at which the first packet switch sends the plurality of packets to the second packet switch via the packet tunnel, wherein congestion control at the first packet switch is provided based on the modifying at the first packet switch, the congestion control comprising dropping packets at the first packet switch instead of dropping packets at the at least one intermediate packet switch.

6. The network operating method of claim 5 wherein the packet tunnel between the first packet switch, the at least one intermediate packet switch, and the second packet switch comprises a plurality of different types of physical links, and wherein the congestion control is configured to adapt the first packet switch based on physical conditions and environment on the plurality of different types of physical links.

7. A network operating method comprising:

operating a packet tunnel between a first packet switch and a second packet switch to send a plurality of packets therebetween, wherein the packet tunnel comprises at least one intermediate packet switch between the first packet switch and the second packet switch and at least one network operated by a separate network operator, wherein the at least one intermediate packet switch and the at least one network are configured to not drop any of the plurality of packets, and wherein the first packet switch and the second packet switch lack performance characteristic data from the at least one network;

accessing or calculating data describing at least one performance characteristic of the packet tunnel and other packet tunnels at one of the first packet switch, the at least one intermediate packet switch, and the second packet switch, wherein the at least one performance characteristic comprises a combination of a frame loss value, a bit error rate value, a latency value, a jitter value, and a bandwidth value;

for the data accessed or calculated at the at least one intermediate packet switch and the second packet switch, transmitting the data to the first packet switch in a type-length-value field of a link layer discovery protocol; and based on the data, modifying a rate at which the first packet switch sends the plurality of packets to the second packet switch via the packet tunnel, wherein congestion control is provided based on the modifying at the first packet switch, the congestion control comprising dropping packets at the first packet switch instead of dropping packets at the at least one intermediate packet switch and the at least one network.

8. The network operating method of claim 7 wherein the packet tunnel between the first packet switch, the at least one intermediate packet switch, the at least one network, and the second packet switch comprises a plurality of different types of physical links, and wherein the congestion control is configured to adapt the first packet switch based on physical conditions and environment on the plurality of different types of physical links.

\* \* \* \* \*